(12) United States Patent
Kresak et al.

(10) Patent No.: US 6,368,099 B1
(45) Date of Patent: Apr. 9, 2002

(54) OVEN-PALLET ALIGNMENT AND PROFILED HEATING OF PREFORMS

(75) Inventors: Paul F. Kresak, Newmarket; Andrea L. Diamond, Kettleby; Svemir Dzafic, Mississauga; David Geiger, Bolton; Christian Georgescu, Newmarket; Peter B. Kamka, Palgrave; Lian Zhang, Cambridge; Robert D. Schad, Toronto; Gary Hughes, Ontario, all of (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/558,046

(22) Filed: Apr. 26, 2000

Related U.S. Application Data

(62) Division of application No. 09/313,974, filed on May 20, 1999, now Pat. No. 6,146,134.

(51) Int. Cl.[7] .............................. B29C 49/68
(52) U.S. Cl. .......................... 425/526; 425/534
(58) Field of Search .............................. 425/526, 534, 425/540, 470, 253

(56) References Cited

U.S. PATENT DOCUMENTS

| | | | | |
|---|---|---|---|---|
| 4,063,867 A | * | 12/1977 | Janniere | 425/526 |
| 4,354,813 A | * | 10/1982 | Collombin | 425/534 |
| 4,483,436 A | * | 11/1984 | Krishnakumar et al. | 198/648 |
| 4,793,960 A | * | 12/1988 | Schad et al. | 264/535 |
| 4,824,359 A | * | 4/1989 | Poehlsen | 425/534 |
| 4,963,086 A | * | 10/1990 | Wiatt et al. | 425/526 |
| RE34,177 E | * | 2/1993 | Coxhead et al. | 432/5 |
| 5,607,706 A | * | 3/1997 | Ingram | 425/526 |
| 5,688,466 A | * | 11/1997 | Mitchell et al. | 425/526 |
| 5,834,038 A | * | 11/1998 | Ogihara | 425/534 |
| 5,853,775 A | * | 12/1998 | Oas et al. | 425/526 |

FOREIGN PATENT DOCUMENTS

| | | | | |
|---|---|---|---|---|
| EP | 0 585 859 A1 | * | 3/1994 | 425/526 |
| EP | 0 593 033 A1 | * | 4/1994 | 425/526 |

\* cited by examiner

*Primary Examiner*—Robert Davis
(74) *Attorney, Agent, or Firm*—Bachman & LaPointe, P.C.

(57) ABSTRACT

The present invention relates to a system for thermally profiling preforms prior to blow molding. The system includes a pallet for holding a plurality of preforms and a station, such as a heating oven, for thermally conditioning the preforms. In a first embodiment, the pallet comprises a self aligning pallet which is movable towards and away from the heating oven. In a second embodiment, the pallet holding the preforms is fixed in position and the heating oven is movable towards and away from the preforms. The pallet further includes rotatable mandrels for supporting the preforms and a programmable motor for rotating the preforms a desired amount and at a desired speed.

10 Claims, 9 Drawing Sheets

OVEN-PALLET ALIGNMENT AND PROFILED HEATING OF PREFORMS

This is a Division, of application Ser. No. 09/313,974 filed May 20, 1999 and now U.S. Pat. No. 6,146,134.

BACKGROUND OF THE INVENTION

The present invention relates to an improvement system for thermally conditioning preforms prior to blow molding and to a pallet used therein.

Injection blow molding and reheat blow molding machines typically use pallets to hold preforms during temperature conditioning prior to blowing. U.S. Pat. No. 4,793,960 to Schad, for example, illustrates a blow molding machine that mounts multiple preforms on each pallet. The pallets are entrained and pass between heating elements in ovens along a straight path. Each pallet holds multiple preforms on mandrels, which are rotatable, as the pallet passes between the heaters. Also shown in this patent is the loading of pallets marshalled to accept a complete injection mold shot of parts, the pallets subsequently being entrained to pass sequentially through a series of temperature conditioning ovens.

U.S. Pat. No. 4,824,359 to Poehlsen illustrates an injection blow molding machine employing multiple preform holders that move in a circular path from injection station through three successive thermal condition stations to a blow molding station.

U.S. Pat. No. 4,063,867 to Janniere shows an injection blow molding machine in which preforms are retained on their cores mounted to a core-carrying bar. Six of these bars are successively loaded into a rotating drum where thermal conditioning of the preforms is carried out while they remain on their cores.

U.S. Pat. No. 4,483,436 to Krishnakumar shows a transport pallet for holding twelve preforms in a neck down orientation within rotatable collets. The pallet has rollers at each end of its upper surface and in pairs along its sides for engaging in track means for guiding the pallet through the machine and through a thermal conditioning system. The collets are rotatable by means of a friction ring mounted to the collet, which engages the side of the track causing rotation of the collet as the pallet passes along the track.

U.S. Pat. No. 4,963,086 to Wiatt shows a reheat blowing machine that shows a belt drive system for rotating multiple collets on a preform carrier during thermal conditioning.

U.S. Pat. No. 34,177 to Coxhead shows an oven for reheating preforms passing through it mounted on pallet mandrels. The heaters of the oven are individually movable by hand to provide a profiled heating arrangement of the preform length. A detent system is used to record individual heater positions so that these can be reproduced when specific preform styles are repeated.

U.S. Pat. No. 5,834,038 to Ogihara shows an oven for reheating preforms using an oven having vertical heaters aligned with the preform vertical axis matching the pitch between the preforms. The heaters are mounted to hinged plates that can alter the vertical alignment angle of the heaters with respect to the preforms.

U.S. Pat. No. 5,853,775 to Oas et al. relates to a method and apparatus for forming stretch blow molded containers in which parisons are heated non-uniformly by rotating at a non-uniform rate in a heating station. A sensor determines the angular orientation of the parisons emerging from the heating station. Each parison is angularly reoriented at a repositioning station prior to introduction into a stretch blow molding station having non-round interior surfaces, so that the temperature profile of each parison corresponds with differential expansion required to form a non-round container.

These patents however suffer from a number of deficiencies. For example, they do not teach the concept of relative movement between the preform pallet and the thermal conditioning device for providing clearance therebetween. Nor do they teach any mechanism for altering the heating profile while the blow molding machine is operating. When the pallets are entrained in a circular path as they pass through the temperature conditioning means, there is a need to optimize their position with respect to the heating elements to ensure all the preforms carried on the pallet are thermally conditioned equally.

SUMMARY OF THE INVENTION

Accordingly, it is an object of the present invention to provide a blow molding system having improved thermal conditioning of the preforms.

It is a further object of the present invention to provide a blow molding system as above which provides improved profile heating of preforms.

It is yet a further object of the present invention to provide an improved self-aligning pallet for use in blow molding systems.

The foregoing objects are attained by the system and pallet of the present invention.

In accordance with the present invention, a system for thermally profiling preforms prior to blow molding is described. The system includes a pallet for holding a plurality of preforms and a station, such as a heating oven, for thermally conditioning the preforms. In a first embodiment, the pallet comprises a self aligning pallet which is movable towards and away from the heating oven. In a second embodiment, the pallet holding the preforms is fixed in position and the heating oven is movable towards and away from the preforms. The pallet further includes rotatable mandrels for supporting the preforms and a programmable motor for rotating the preforms a desired amount and at a desired speed.

Other details of the system and pallet of the present invention, as well as other objects and advantages attendant thereto, are set forth in the following detailed description and the accompanying drawings, in which like reference numerals depict like elements.

DETAILED DESCRIPTION OF THE PREFERRED EMBODIMENT(S)

Figure 1:
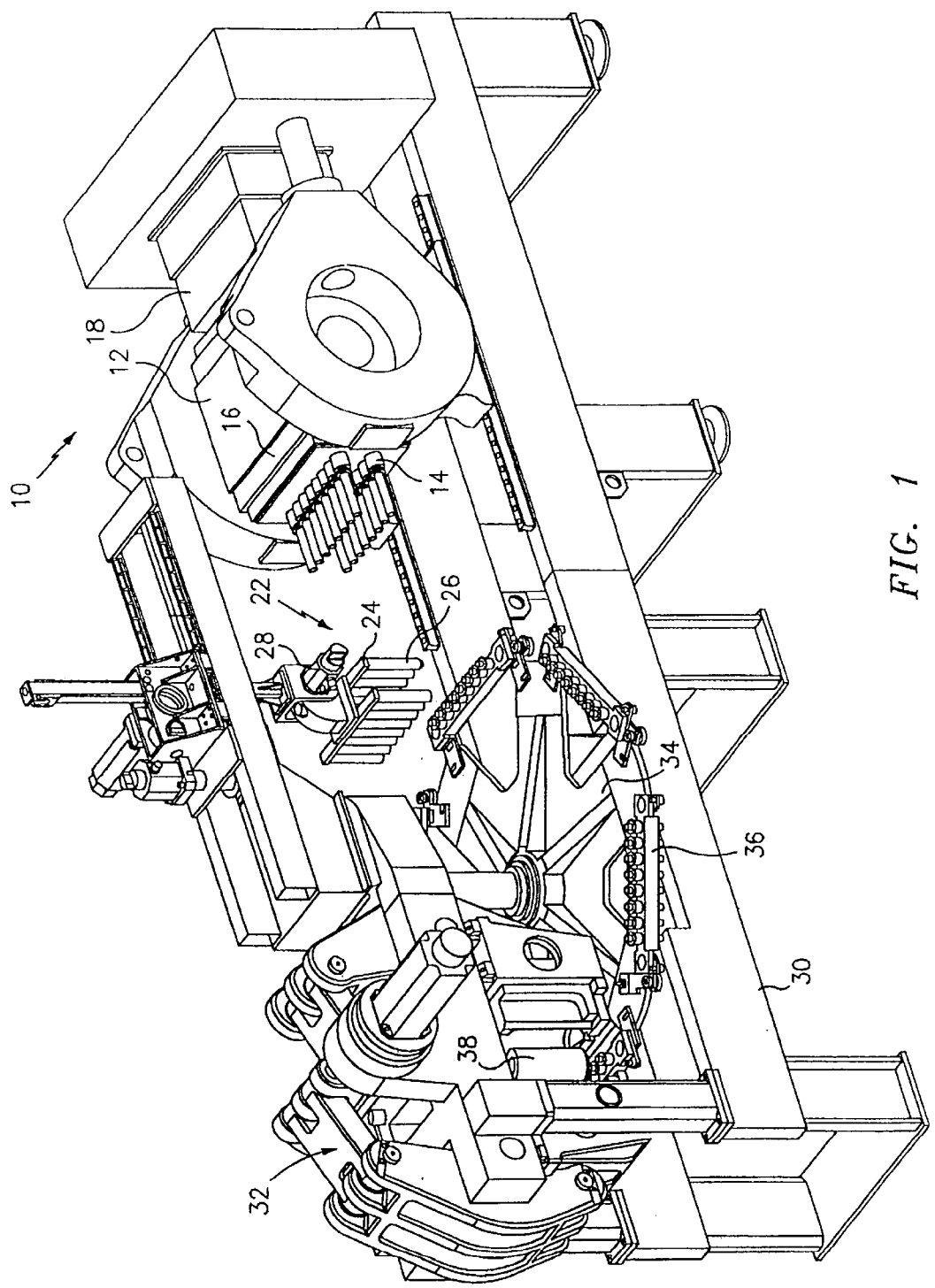
FIG. 1 is an isometric view of a reheat blow molding machine attachment mounted to the end of an index injection molding machine.

Referring now to the drawings, FIG. 1 illustrates an index injection molding machine 10 containing a two face index mold 12 having a plurality of mold cores 14 on each of its faces 16 and 18. In a preferred construction, each face 16 and 18 has sixteen mold cores 14 thereon.

The index injection molding machine 10 is used to mold preforms 20 (see FIG. 3) in a known manner. The molded preforms 20 are presented to a robot 22 for removal from the cores 14 at the rear of the machine 10. The robot 22 has a tooling plate 24 with a plurality of cooled carrier tubes 26 mounted at a matching pitch to the injection cores 14. The number of cooled carrier tubes 26 on the tooling plate 24 equals the number of mold cores 14. The tooling plate 24 is mounted on a 90 degree pivoting head 28 so that after removal of the preforms 20 from the cores 14 while the cores 14 are in a horizontal position, the carrier tubes 26 can be turned to a vertical position with the tubes 26 containing the preforms 20 neck downward. The preforms 20 are held in the tubes 26 by application of a vacuum in a known manner. The vacuum holding system does not form part of the present invention and therefore has not been described in detail.

Attached to the rear of the base 30 of the machine 10 is a reheat blow molding machine attachment 32 which includes, in addition to the robot assembly 22, a six position horizontal rotatable table 34, with preform carrying pallets 36 mounted at each of six equispaced positions. An electric servo driven clamp 38 is mounted at one of the positions for stretch blow molding preheated preforms.

Figure 2:
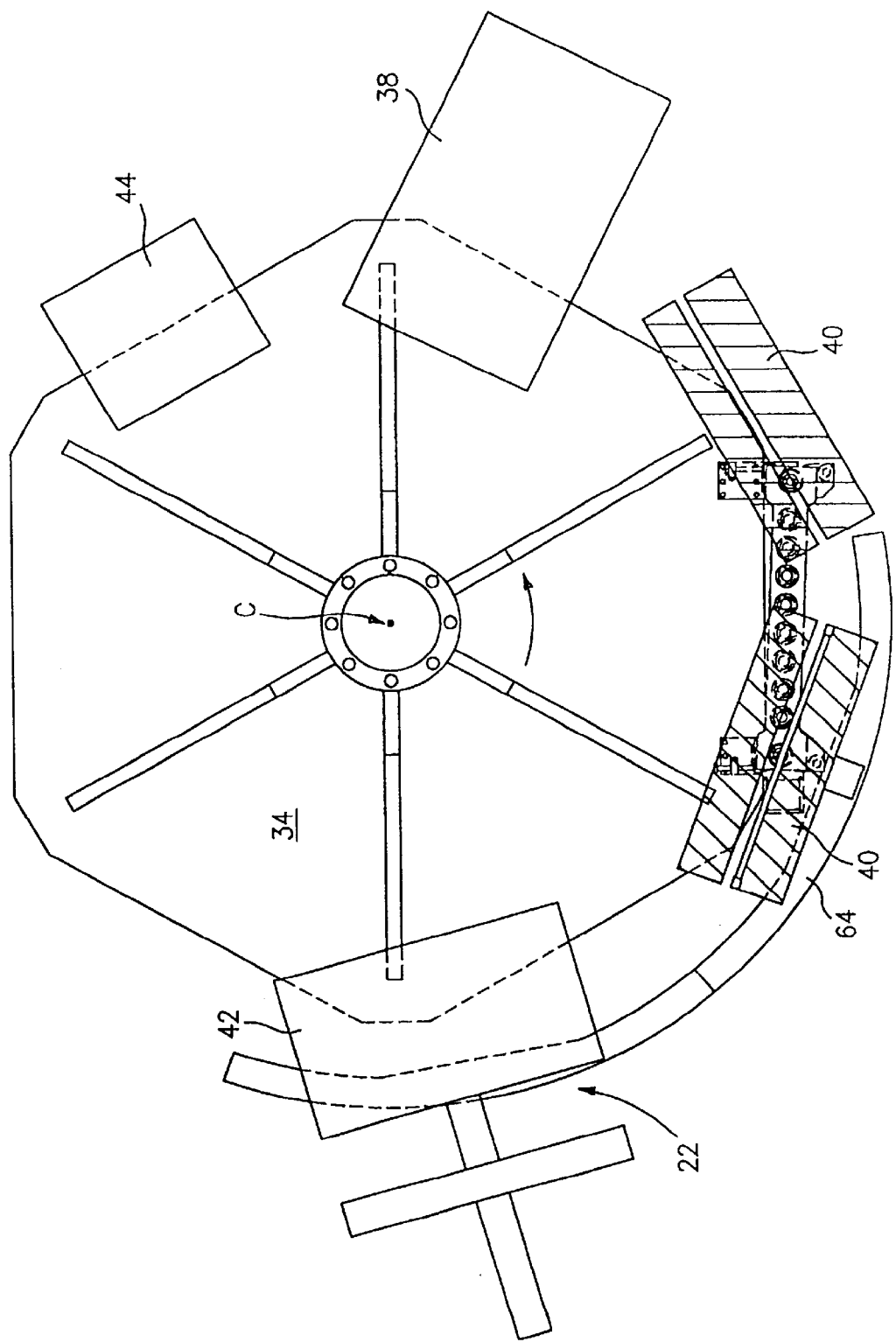
FIG. 2 is a plan view of a rotary table used in the reheat blow molding machine of FIG. 1 and the stations around the table.

Referring now to FIG. 2, the rotary table 34 includes a loading station 42 at which the robot 22 loads batches of preforms 20 onto the individual pallets 36. As shown in this figure, one or two of the positions preceding the blow molding station 38 is occupied by a thermal conditioning station 40, typically a preheating oven assembly. At the position immediately following the blow molding station 38, a stripper station 44 removes the blown articles from the pallets 36. FIG. 2 schematically illustrates the relative positions of these stations.

The speed of rotation of the table 34 is synchronized with the injection molding cycle of the index injection molding machine 10 so as to optimize the production efficiency of both processes—injection molding and stretch blow molding, for given cavitation combinations of injection molds and blow molds. A typical blow cycle time is three seconds with time for rotation between the six stations less than 0.5 seconds. The table 34 may be rotated by a direct frameless servo electric drive, servo driven belt drive, or any other known drive means (not shown) of sufficient speed and positional accuracy.

Figure 3:
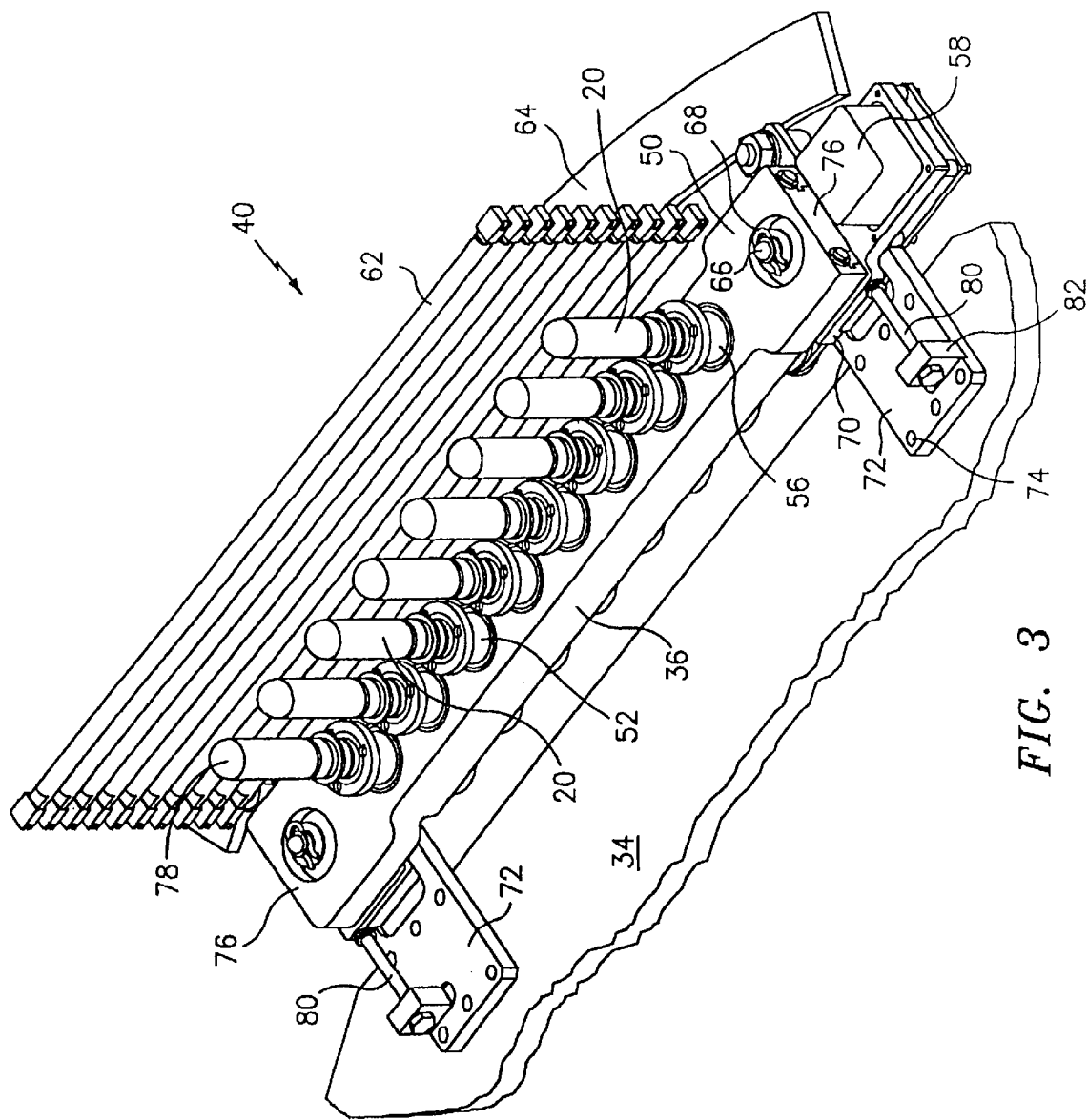
FIG. 3 is an isometric top view of a self aligning pallet assembly in accordance with the present invention.
Figure 4:
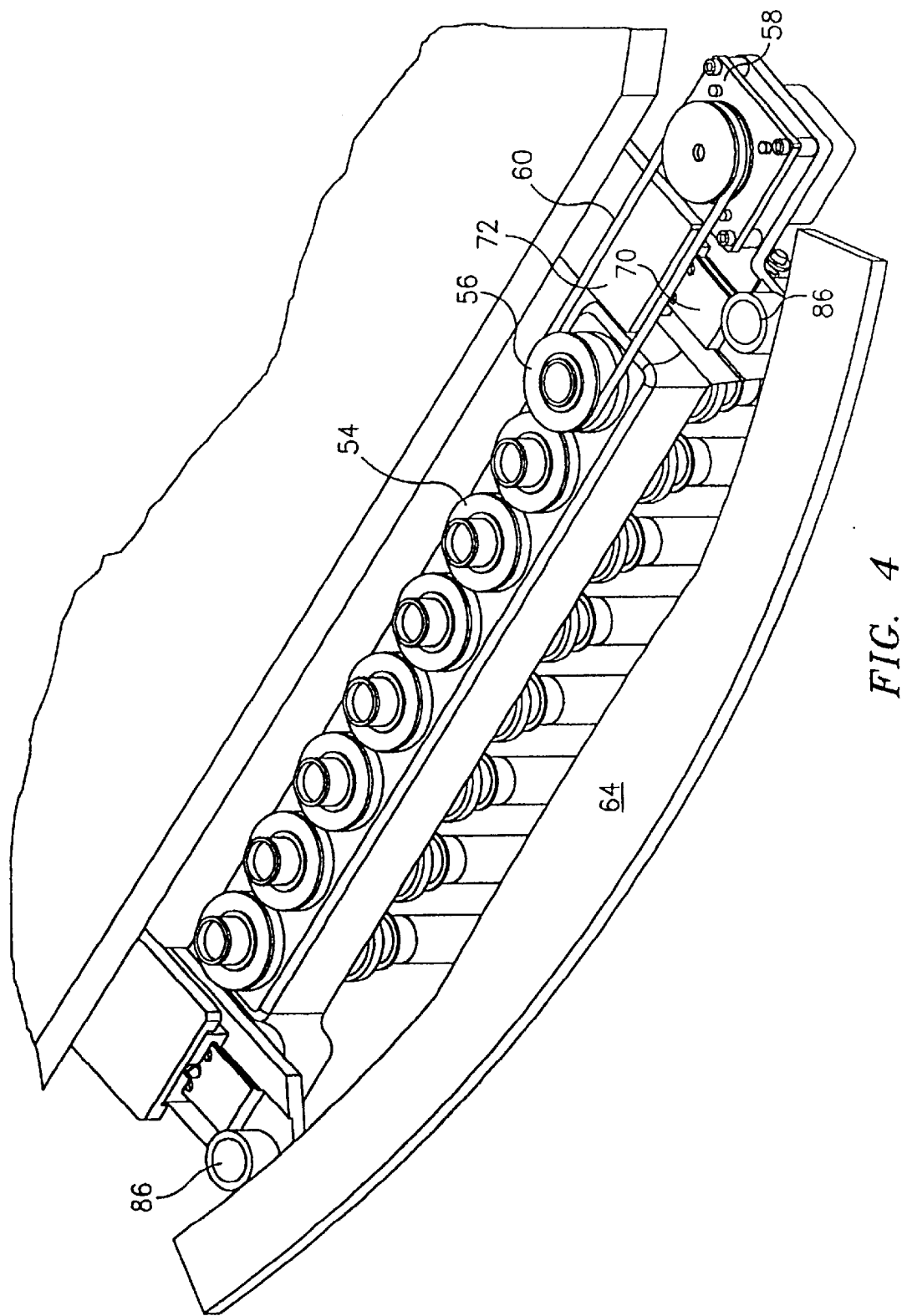
FIG. 4 is a bottom view of the pallet of FIG. 3.

FIGS. 3 and 4 show the top side and the bottom sides of a self-aligning pallet 36 in accordance one aspect of the present invention. FIG. 3 shows the self-aligning pallet 36 at one of the thermal conditioning stations 40, preferably a heating station. The self-aligning pallet 36 is shown in position for heating a batch of preforms 20 carried by it.

The self-aligning pallet 36 comprises a bar 50 which carries rotatable mandrels 52 on which are positioned the preforms 20. As shown in FIG. 4, the mandrels 52 include a primary mandrel 56. The mandrels 52 and 56 have drive wheels 54 that frictionally contact each other or are geared to mesh. The primary mandrel 56 is joined to a motor 58 via a belt 60. When primary mandrel 56 is rotated by the motor 58 via belt 60, the primary mandrel 56 drives all the mandrels 52 on the pallet 36 the same rotational amount and at the same rotational speed but in alternating directions.

The motor 56 may be a stepper motor or a programmable servo motor or an AC frequency drive and AC motor. By using such a motor to drive the mandrels 52 and 56, programmable profile heating of the preforms 20 can be carried out. Since the preforms 20 are loaded directly onto the mandrels 52 and 56 from the index molding machine 10 using the robot 22, the rotational orientation of the preforms 20 with respect to the blow mold cavities is known. Accordingly, if a variable heating profile around the periphery of a preform 20 is desired to produce non-round blown molded articles that require variable degrees of stretching, the variably heated preform can be obtained by programming the degree of rotation and speed of rotation of the preform while it is in the oven assembly 40.

FIG. 3 shows an oven assembly 40 having a bank of heater elements 62 positioned parallel to the longitudinal axis of the pallet 36 when the rotary table 34 stops during each cycle and a pallet 36 containing a batch of preforms 20 is in the oven assembly 40. The self-aligning pallets 36 to be used in this embodiment of the present invention can be changed so that differing numbers of mandrels 52 and 56, corresponding to the number of cavities in the blow mold can be installed. The overall length of each self-aligning pallet 36 is the same so that it can be interchangeably installed on the rotary table 34 and be connected to a motor 58 via a belt 60 which may vary in length depending on the positioning and the number of mandrels 52 on the pallet 36.

The distance between the heater elements 62 and the preforms 20 on the pallet 36 is a function of the pallet length and the radius of the rotary table 34. In order to provide efficient heating performance and a desired temperature profiling of the preforms 20, it is necessary to minimize this distance and in the case of the instant machine, two approaches can be used.

A first approach is shown in FIGS. 3–9 in which the self-aligning pallets 36 are used. The self-aligning pallets 36 are movably mounted to the rotary table 34 and are guided through each oven assembly 40 by a cam 64 attached to the machine base 30. The self-aligning pallets 36 are designed so that when stopped in a heating position, the pallet 36 is closer to the heating elements 62 than could otherwise be obtained when compared to a pallet fixed rigidly to the table 34.

At each end of the pallet 36, there is a removable connection boss 66 over which the pallet 36 fits. The pallet 36 is retained in place on the bosses 66 by spring clips 68. As best seen in FIG. 4, each boss 66 is mounted to a respective sliding arm 70 that slides within a respective mounting arm 72 bolted to the rotary table 34 by screws 74. There is sufficient travel in each boss mounting to allow each pallet end 76 to move toward the center C of the rotary table 34 a sufficient distance to move the endmost preform 78 past the end of the heater assembly 40 with ample clearance—typically 1 to 2 inches.

Figures 5, 9:
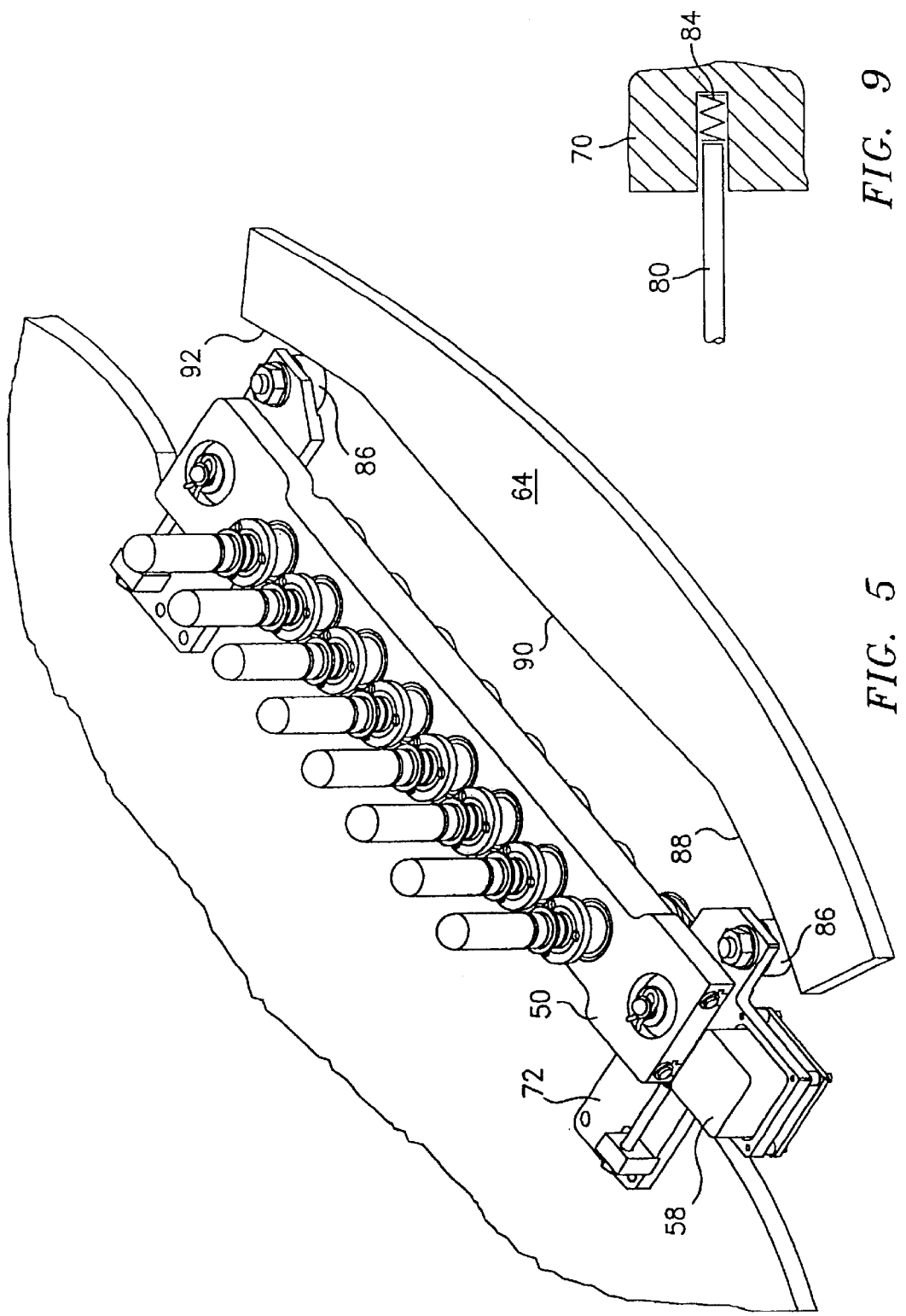
FIG. 5 is a top view showing the cooperation between the pallet of FIG. 3 and a cam.
FIG. 9 is a sectional view of a sliding arm connected to the pallet of FIG. 3.

Referring now to FIGS. 3 and 9, a spring loaded rod 80, fixed to a bracket 82 on each mounting arm 72, slides within each sliding arm 70. A spring 84 positioned within each sliding arm 70 and contacting an end of rod 80 urges the respective sliding arm 70 away from the center C of the rotary table 34 and keeps cam followers 86 mounted on the ends of the pallet 36 in contact with the cams 64. As can be seen from FIG. 4, motor 58 is mounted to one of the sliding arms 70 and accordingly moves with it.

Figure 6:
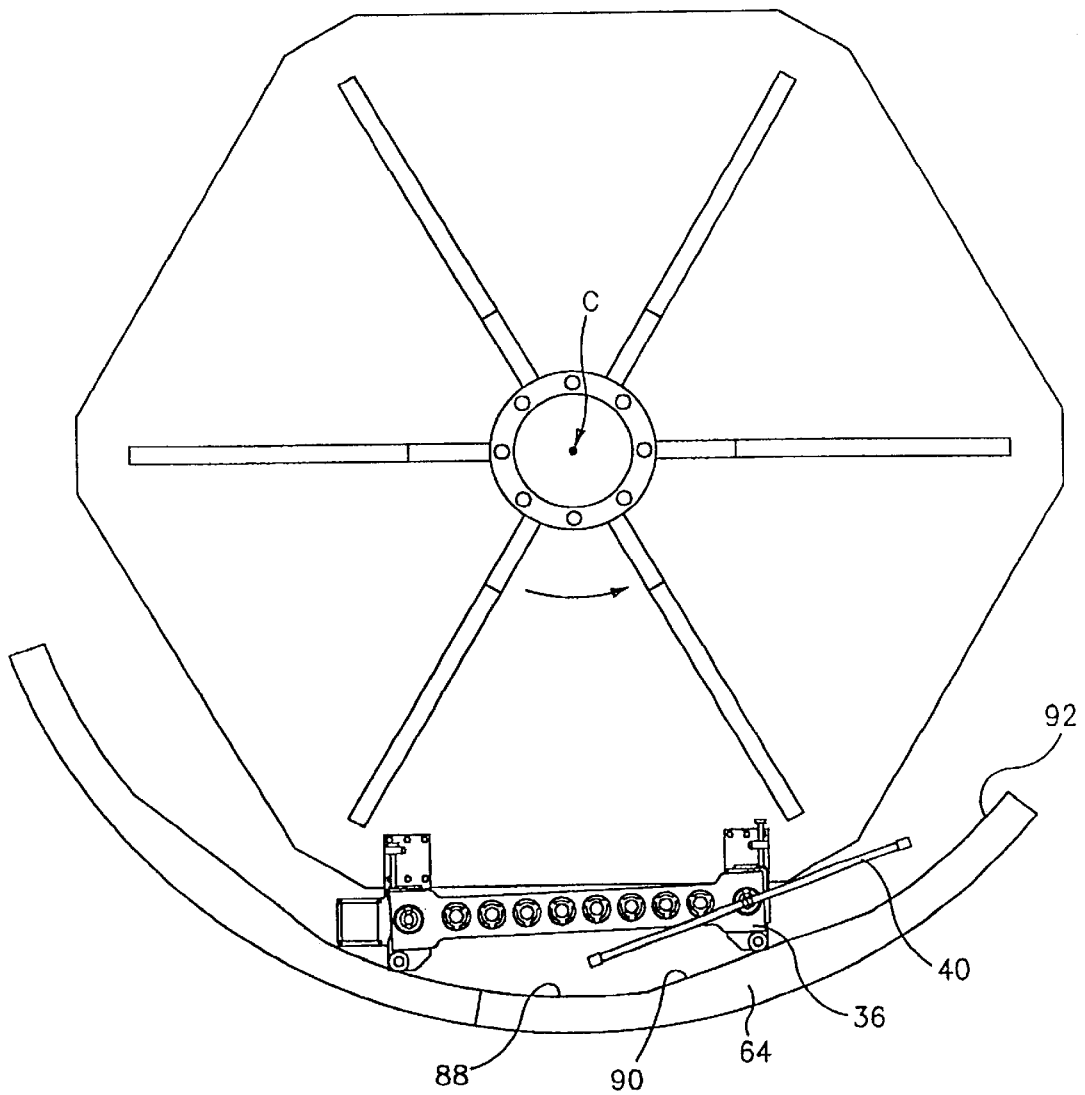
FIG. 6 is a top view of the rotary table of FIG. 2 and the pallet of FIG. 3 as the pallet enters an oven for heating the preforms.
Figure 7:
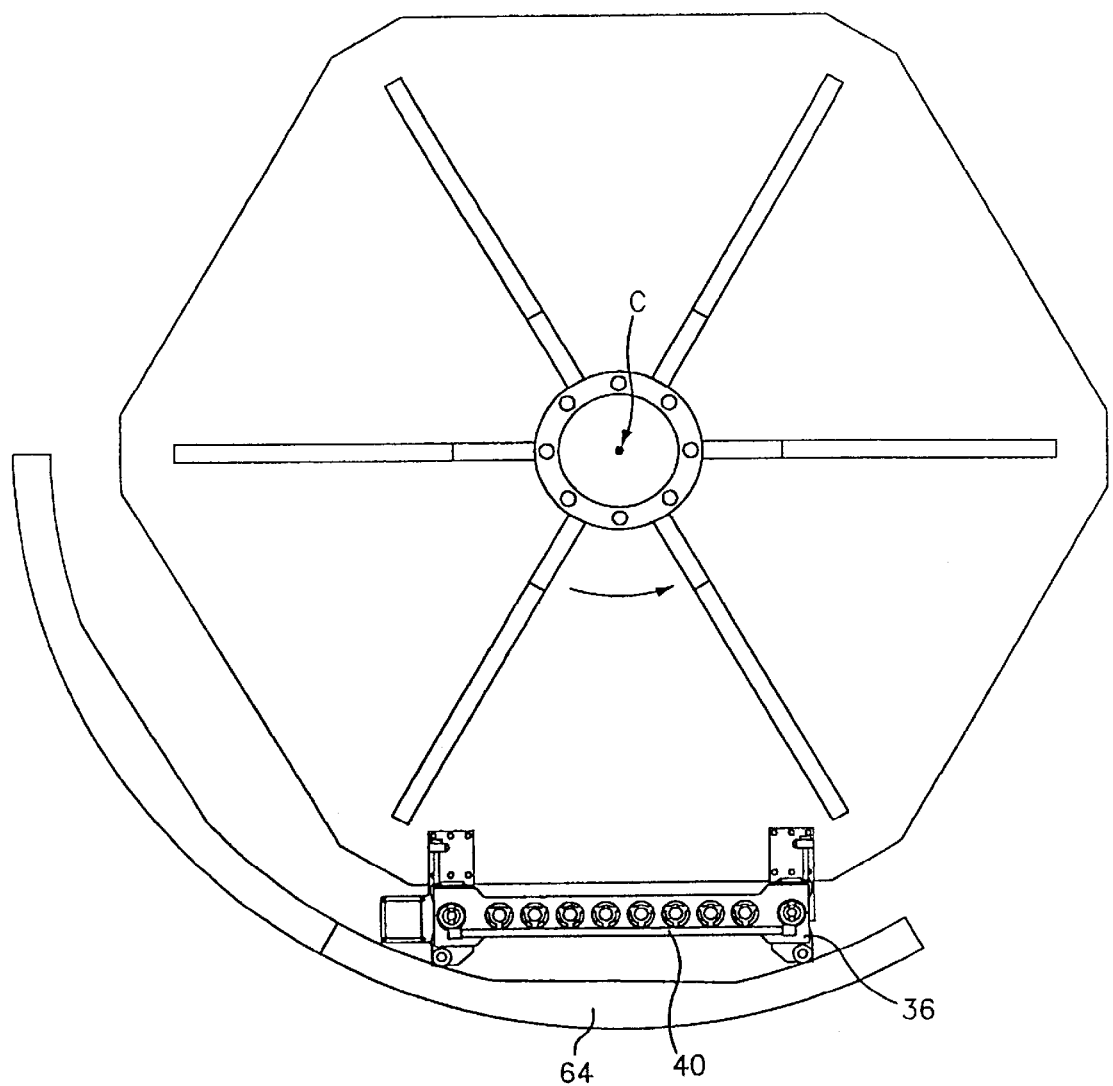
FIG. 7 is a top view of the rotary table and the pallet of FIG. 6 in the heating position.
Figure 8:
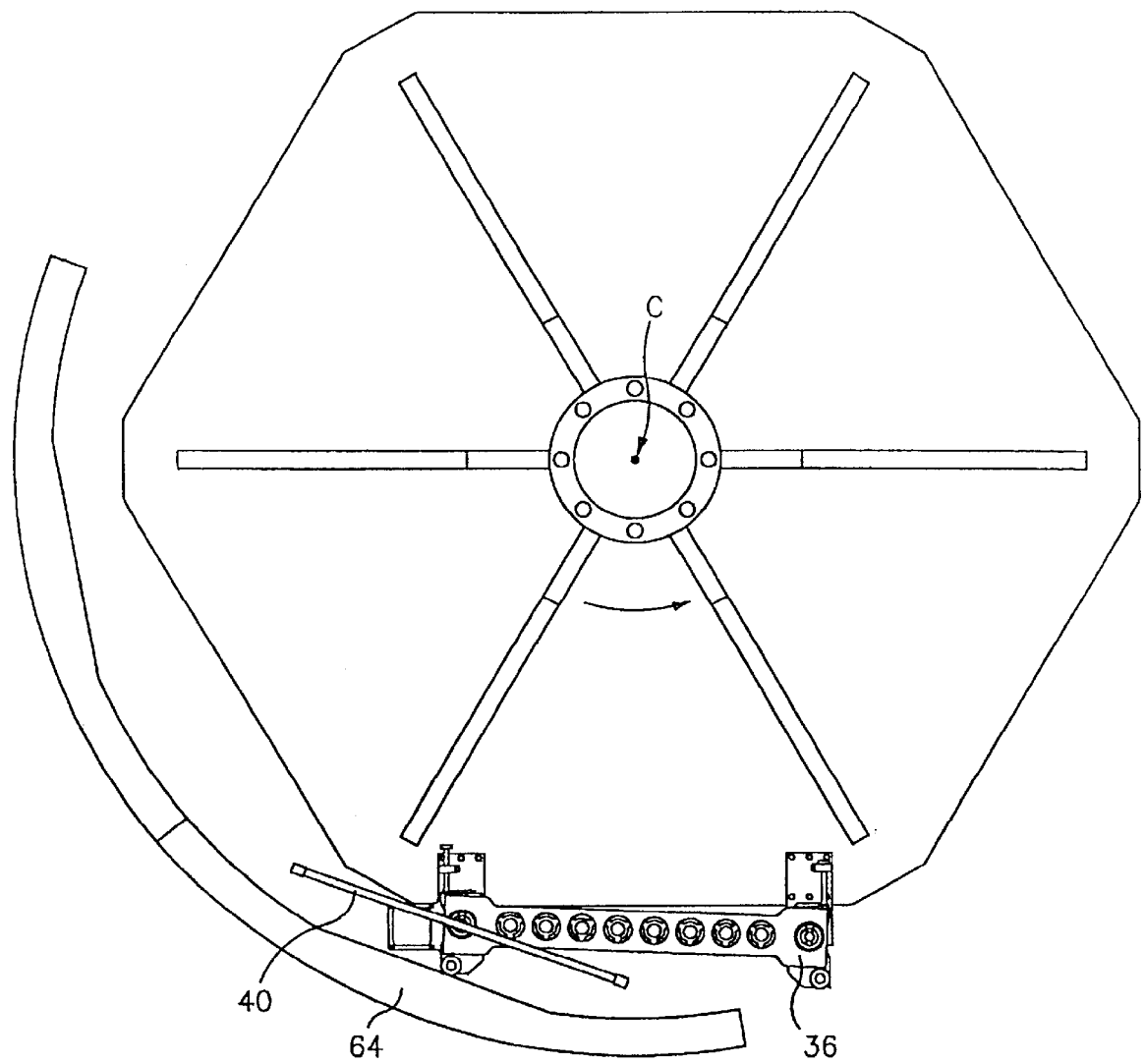
FIG. 8 is a top view of the rotary table and the pallet of FIG. 6 as the pallet exits the oven.

As can be seen from the foregoing description, each end of the pallet 36 is able to move toward and away from the center C of the rotary table 34 by an amount of travel limited by the length of the rod 80. FIGS. 4 and 5 show the cam followers 86 at each end of the pallet 36 that run along the cam 64 fastened to the machine base 30. As can be seen from these figures, the cam 64 has a number of camming surfaces 88, 90 and 92. As the rotary table 34 turns, the contact between the cam followers 86 and the cam 64 and its camming surfaces 88, 90, and 92 cause the pallet ends to be guided either inward or outward with respect to the center C so as to pass closely adjacent the fixed position of the heater assembly or oven 40 and to achieve a heating position closer to the heater elements 62 than otherwise would be achievable. FIGS. 6–8 show various positions of the pallet 36 with respect to the fixed heater assembly or oven 40 as the table 34 rotates through one process cycle (one sixth of a revolution). FIG. 6 shows the self aligning pallet 36 as it enters the heating assembly or oven 40. FIG. 7 illustrates the self-aligning pallet 36 while in a heating position. FIG. 8 illustrates the self-aligning pallet 36 as it exits the heating assembly or oven 40.

By positioning the preforms 20 on the self-aligning pallets 36 as close as possible to the heating elements 62 and by rotating the preforms 20 on the mandrels 52 and 56 a desired amount and at a desired speed using the motor 58, a desired temperature profiling can be imparted to the preforms. Further, if necessary, different temperature profiling can be imparted to the preforms 20 in different batches. All of this can be accomplished without interrupting the operation of the molding machine 10 and the blow molding machine 38.

Figure 10:
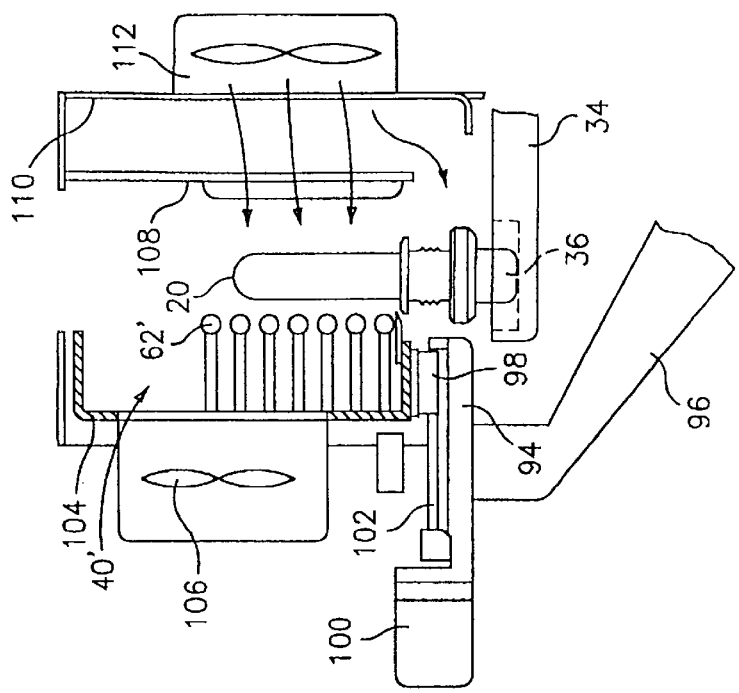
FIG. 10 is a sectional view of a movable oven assembly for use in the blow molding machine of FIG. 1.
Figure 11:
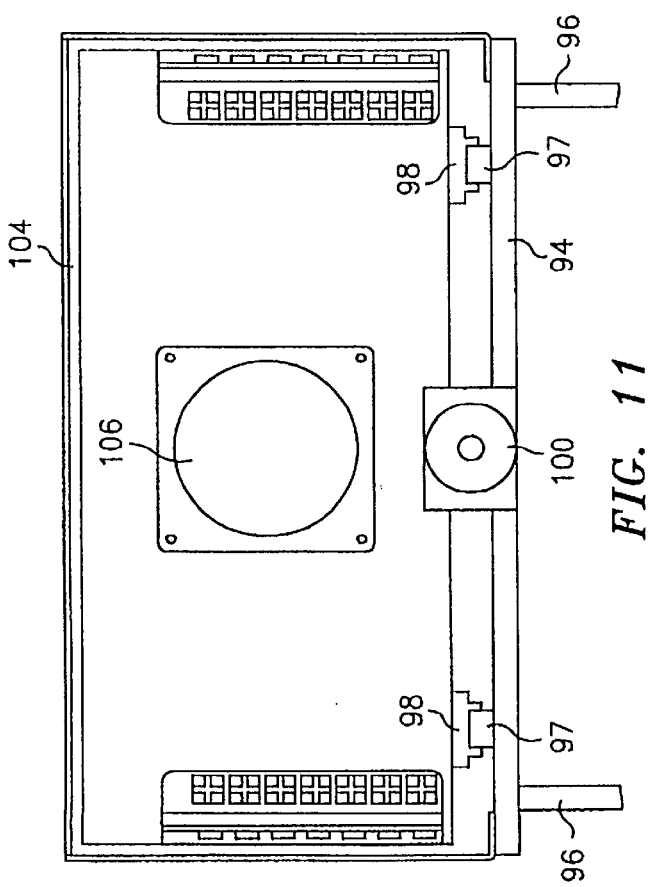
FIG. 11 is a rear view of the movable oven assembly of FIG. 10.
Figure 12:
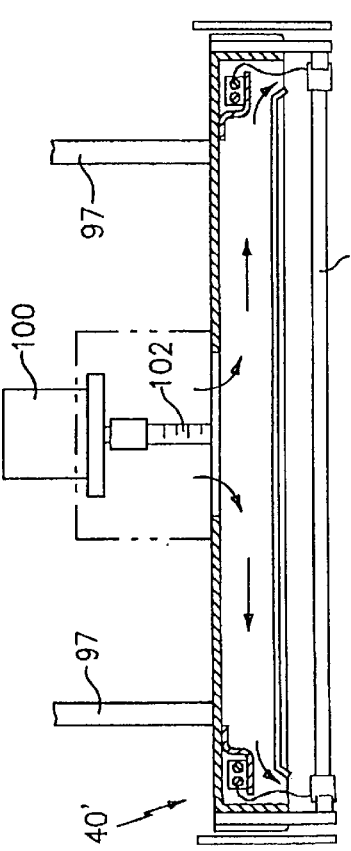
FIG. 12 is a top sectional view through the movable oven assembly of FIG. 10.

FIGS. 10–12 illustrate an alternate and preferred embodiment of a system for thermally profiling preforms to be blow molded. In this system, the pallets 36 are fixedly secured to the rotary table 34 and the heating or oven assembly 40' is moved towards and away from the preforms 20 as the table 34 rotates so that an optimized heater to preform distance can be achieved when the table 34 stops rotating at each cycle. Each pallet 36, in this system, is connected at its end to the rotary table 34 by quick release clips.

The oven assembly 40' is movably mounted to a support 94 secured to the machine base 30 by brackets 96. The oven assembly 40' has guide means 98 attached to it for guiding the oven assembly 40' as it moves towards and away from the pallet 36 and the preforms 20 and towards and away from the center C of the rotary table 34. The guide means may comprise any suitable guide means known in the art. For example, the support 94 may have one or more tracks 97 and the guide means 98 may comprise C-shaped members which move along the tracks.

A motor 100 is also secured to oven assembly 40'. The motor 100 may be supported on the base 30 using any suitable means known in the art such as a mounting bracket. Drive means 102, such as a ball screw drive, is connected at a first end to the motor 100. The drive means 102 is connected to the oven assembly 40' at a second end opposed to the first end at which it is connected to the motor 100. The drive means 102 is driven by the motor 100 to move the oven assembly 40' towards and away from the pallet 36 and the preforms 20.

The oven assembly 40' includes a bank of heating elements 62', a shroud 104 surrounding the heating elements 62' and a fan 106 for ducting air toward the preforms 20. In operation, the oven assembly 40' is moved away from center C of the table 34 to provide clearance for an entering pallet 36 and its preforms 20. As the leading preform passes a first end of the oven assembly 40', the motor 100 is powered to cause the oven assembly 40' to move toward the table center C, stopping at a preprogrammed distance from the preforms 20 to optimize the heating thereof. Typically, the oven assembly moving distance is about 1 to 2 inches. After the heating cycle time has elapsed, the table 34 rotates to move the pallet 36 out of the oven assembly 40' and the motor 100 is powered to move the oven assembly 40' away from the table center C in synchronization to provide sufficient clearance for the trailing preform to clear the oven assembly 40' as the trailing preform and the pallet 36 exit the oven assembly 40'.

If desired, a heating reflector 108, surrounded by a shroud 110, may be positioned opposite the oven assembly 40' to optimize heating efficiency. A second fan 112 may be provided to conduct reflected heated air towards the preforms 20. The heating reflector 108, shroud 110, and fan 112 may be secured to the table 34 via any suitable means known in the art.

The pallet 36 used in this embodiment of the present invention preferably has rotatable mandrels supporting the preforms 20 to be heated. The mandrels may be rotated in alternating directions and at a desired rotation speed and a desired distance using the motor and drive system shown in FIG. 4. The only difference would be that the motor 58 is mounted to a fixed location on the underside of the pallet 36 instead of a sliding arm.

In addition to being a lower cost construction, the system of FIGS. 10–12 provides the ability to move the heating elements 62' toward or away from the preforms 20 during the heating cycle to customize on-line the heating profile of the preforms 20. This control can be readily achieved using known control means employing servo or stepper motors and positioning feedback sensors and control such that the machine operator can readily adjust preform heating during machine operation without any requirement to make manual adjustments to the hardware. The heater assembly can be moved to vary the distance from the preform from ⅜" to 1.25", while the machine is operating. All prior machines have to stop the machine to manual adjust this distance. The operator judges how to set the distance by examining the bottle quality that is blown.

An advantage of the present invention is the ability to provide different heating profiles for each pallet preform load as it passes through an oven assembly or some other thermal conditioning station. Because robot 22 unloads two rows of preforms 20 from the injection molding machine 10 and loads these sequentially onto two adjacent pallets 36, there is a different amount of time the two sets of preforms 20 spend in the cooling tubes 26 on the robot 22. The preforms 20 loaded onto the first available pallet receive one cycle's worth, typically three seconds, less cooling time than the preforms loaded onto the pallet immediately behind it This variation in cooling time can be compensated for by programming the oven heating profile to provide more heat to the preforms on the second loaded pallet as it passes through the oven. Thus all the preforms entering the stretch blow mold will have identical heat profiles so that quality deficiencies in blown articles due to variations in preform heating profiles are eliminated.

It is apparent that there has been provided in accordance with the present invention an oven-pallet alignment and profiled heating of preforms which fully satisfies the means, objects, and advantages set forth hereinbefore. While the present invention has been described in the context of specific embodiments thereof, other variations, alternatives, and modifications will be apparent to those skilled in the art after reading the instant description. It is intended to embrace those variations, modifications, and alternatives which fall within the broad scope of the appended claims.

What is claimed is:

1. A pallet for use in a blow molding machine having a preform thermal conditioning station, said pallet comprising:

a bar;

means on said bar for supporting a plurality of preforms;

means for connecting said bar to a movable support; and means for moving said bar relative to said movable support to guide said bar and said preforms through said thermal conditioning station.

2. pallet for use in a blow molding machine having a preform thermal conditioning station, said pallet comprising:

a bar;

means on said bar for supporting a plurality of preforms;

means for connecting said bar to a support;

means for moving said bar relative to said support to guide said bar and said preforms through said thermal conditioning station; and said connecting means comprising a pair of mounting arms secured to said support, a sliding arm associated with each of said mounting arms, each said sliding arm being movable relative to a respective one of said mounting arms, a boss connected to each said sliding arm, and clip means for joining a respective end of said bar to one of said bosses.

3. A pallet according to claim 2, wherein each said sliding arm allows a respective end of said bar to move toward and away from the center of said support.

4. A pallet according to claim 3, further comprising:

a cam arrangement fixedly positioned relative to said support; and a cam follower mounted on each end of said bar for cooperating with said cam arrangement so as to move each end of said bar toward and away from the center of said support.

5. A pallet according to claim 4, further comprising:

two mounting brackets attached to said support;

a rod fixed to each of said brackets, each said rod sliding within a respective one of said sliding arms; and a spring within each sliding arm for cooperating with said rod to allow movement of a respective end of said bar towards and away from the center of said support.

6. A pallet according to claim 1, wherein said means for supporting said preforms comprises rotatable mandrels.

7. A pallet according to claim 6, further comprising means for performing programmable profile heating of said preforms.

8. A pallet according to claim 7, wherein said performing means comprises means for programming the degree of rotation and the speed of rotation for each said preform.

9. A pallet according to claim 8, wherein said programming means comprises at least one of a stepper motor and a programmable servo motor for driving the mandrels.

10. A pallet for use in a blow molding machine having a preform thermal conditioning station, said pallet comprising:

a bar;

means on said bar for supporting a plurality of preforms;

means for connecting said bar to a support;

means for moving said bar relative to said support to guide said bar and said preforms through said thermal conditioning station;

said means for supporting said preforms comprises rotatable mandrels;

means for performing programmable profile heating of said preforms;

said performing means comprising means for programming the degree of rotation and the speed of rotation for each said preform; and said programming means further comprising drive means associated with each said mandrel, said drive means driving all of said mandrels on said pallet the same rotational amount and speed but in alternating directions.

* * * * *